United States Patent
Camble et al.

(10) Patent No.: US 9,824,131 B2
(45) Date of Patent: Nov. 21, 2017

(54) REGULATING A REPLICATION OPERATION

(75) Inventors: Peter Thomas Camble, Bristol (GB); Andrew Todd, Bristol (GB); Ramadoss Nirmal, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 483 days.

(21) Appl. No.: 14/373,848

(22) PCT Filed: Mar. 15, 2012

(86) PCT No.: PCT/IN2012/000178
§ 371 (c)(1),
(2), (4) Date: Jul. 22, 2014

(87) PCT Pub. No.: WO2013/136339
PCT Pub. Date: Sep. 19, 2013

(65) Prior Publication Data
US 2015/0032696 A1    Jan. 29, 2015

(51) Int. Cl.
| G06F 17/30 | (2006.01) |
| G06F 11/14 | (2006.01) |
| G06F 11/20 | (2006.01) |
| H04L 29/08 | (2006.01) |
| H04L 29/06 | (2006.01) |

(52) U.S. Cl.
CPC .... G06F 17/30575 (2013.01); G06F 11/1456 (2013.01); G06F 11/2094 (2013.01); H04L 67/1095 (2013.01); H04L 69/04 (2013.01); *G06F 11/2097* (2013.01)

(58) Field of Classification Search
CPC ......... G06F 17/30575; G06F 17/30082; H04L 67/1095
USPC .......................................... 707/634, 622, 654
See application file for complete search history.

(56) References Cited

U.S. PATENT DOCUMENTS

| 5,805,827 A * | 9/1998 | Chau ................. H04Q 11/0435 |
| | | 709/246 |
| 7,213,158 B2 | 5/2007 | Bantz et al. |
| 7,299,376 B2 | 11/2007 | Kodi et al. |
| 7,558,012 B2 | 7/2009 | Lee |

(Continued)

FOREIGN PATENT DOCUMENTS

| CN | 1908910 A | 2/2007 |
| CN | 101105763 | 1/2008 |

(Continued)

OTHER PUBLICATIONS

ISR/WO PCT/IN2012/000178, HP reference 82962481, dated Dec. 20, 2012, 14 pps.

(Continued)

*Primary Examiner* — Vincent F Boccio
(74) *Attorney, Agent, or Firm* — Trop, Pruner & Hu, P.C.

(57) ABSTRACT

A technique includes determining at least one metric associated with a replication operation to replicate at least a portion of a first object stored on one of a client, a first storage appliance and a second storage appliance onto another one of the client, the first storage appliance and the second storage appliance. The technique further includes regulating the replication operation including selectively regulating at least one parameter of the replication operation based on the metric(s).

18 Claims, 7 Drawing Sheets

(56) References Cited

U.S. PATENT DOCUMENTS

| | | |
|---|---|---|
| 7,610,348 B2 | 10/2009 | Kisley et al. |
| 7,761,875 B2 | 7/2010 | Karamanolis et al. |
| 7,827,136 B1 | 11/2010 | Wang et al. |
| 7,827,192 B2 | 11/2010 | Batterywala |
| 7,925,623 B2 | 4/2011 | Therrien et al. |
| 7,934,066 B2 | 4/2011 | Mu et al. |
| 7,987,158 B2 | 7/2011 | Boyd et al. |
| 8,060,759 B1 | 11/2011 | Arnan et al. |
| 8,185,498 B2 | 5/2012 | Anglin |
| 8,280,932 B2 | 10/2012 | Horn |
| 8,315,976 B2 | 11/2012 | Multer et al. |
| 8,402,250 B1 | 3/2013 | Julliard |
| 2002/0080721 A1* | 6/2002 | Tobagi .............. H04L 29/06 709/233 |
| 2004/0088331 A1 | 5/2004 | Therrien et al. |
| 2006/0048002 A1 | 3/2006 | Kodi et al. |
| 2006/0053088 A1 | 3/2006 | Ali et al. |
| 2008/0052327 A1 | 2/2008 | Buah |
| 2008/0077993 A1 | 3/2008 | Zimmer et al. |
| 2008/0244204 A1 | 10/2008 | Cremelie et al. |
| 2008/0259822 A1* | 10/2008 | Funk .................. H04L 47/10 370/255 |
| 2009/0063587 A1 | 3/2009 | Jakob |
| 2009/0164529 A1 | 6/2009 | McCain |
| 2010/0082700 A1 | 4/2010 | Parab |
| 2010/0094817 A1 | 4/2010 | Ben-Shaul et al. |
| 2010/0180075 A1 | 7/2010 | McCloskey et al. |
| 2011/0010496 A1 | 1/2011 | Kirstenpfad et al. |
| 2011/0161291 A1 | 6/2011 | Taleck et al. |
| 2011/0161294 A1* | 6/2011 | Vengerov .......... G06F 17/30581 707/637 |
| 2011/0270800 A1 | 11/2011 | Chou et al. |
| 2012/0011394 A1 | 1/2012 | Maki et al. |
| 2012/0017059 A1 | 1/2012 | Gold et al. |
| 2012/0078852 A1* | 3/2012 | Haselton .......... G06F 17/30082 707/654 |
| 2015/0046398 A1 | 2/2015 | Camble et al. |

FOREIGN PATENT DOCUMENTS

| | | |
|---|---|---|
| CN | 101820426 | 9/2010 |
| CN | 101908077 | 12/2010 |
| EP | 0720085 | 7/1996 |
| GB | 2423218 | 8/2006 |

OTHER PUBLICATIONS

EMC, "EMC Data Domain Boost for Symantec NetBackup and NetBackup Storage Unit Group Failover," Jun. 2010, <http://www.emc.com/collateral/software/white-papers/h7334-data-domain-boost-netbackup-wp.pdf> (13 pages).

EMC, "EMC Introduces DD Boost Software for Data Domain Deduplication Storage Systems," May 11, 2010, Press Release, <http://www.emc.com/about/news/press/2010/20100511-01.htm> (3 pages).

European Patent Office, Communication Pursuant to Article 94(3) EPC, issued in European Patent App. No. 12871109, dated Apr. 20, 2016, 3 pages.

Extended European Search Report received in EP Application No. 12871109.0, dated Sep. 19, 2015, 4 pages.

Hewlett-Packard Development Company, L.P., "Best Practices for VTL, NAS and Replication Implementations," (Research Paper), Jun. 7, 2012, 131 pages, available at http://bizsupport2.austin.hp.com/bc/docs/support/SupportManual/c02511912/c02511912.pdf.

International Preliminary Report on Patentability received in PCT Application No. PCT/US2012/029144, dated Sep. 25, 2014, 7 pages.

International Search Report & Written Opinion received in PCT Application No. PCT/US2013/050990, dated Apr. 22, 2014, 10 pages.

International Search Report received in PCT Application No. PCT/US2012/029144, dated Nov. 20, 2012, 11 pages.

Lelii, S., "Quantum Put DXi Accent on Dedupe Backup Target," (Research Paper), TechTarget, Jul. 28, 2011, 2 pages, available at http://searchdatabackup.techtarget.com/news/2240038962/Quantum-puts-DXI-Accent-on-dedupe-backup-target.

Ungureanu, C. et al., "HydraFS: A High-Throughput File System for the HYDRAstor Content-Addressable Storage System," (Research Paper), FAST, vol. 10, 2010, 14 pages, available at http://static.usenix.org/event/fast10/tech/full_papers/ungureanu.pdf.

* cited by examiner

REGULATING A REPLICATION OPERATION

BACKGROUND

A typical computer network may have a backup and recovery system for purposes of restoring data (data contained in one or multiple files, for example) on the network to a prior state should the data become corrupted, be overwritten, subject to a viral attack, etc. The backup and recovery system typically includes mass storage devices, such as magnetic tape drives and/or hard drives; and the system may include physical and/or virtual removable storage devices.

For example, the backup and recovery system may store backup data on magnetic tapes, and after a transfer of backup data to a given magnetic tape, the tape may be removed from its tape drive and stored in a secure location, such as in a fireproof safe. The backup and recovery system may alternatively be a virtual tape library-based system that emulates and replaces the physical magnetic tape drive system. In this manner, with a virtual tape library-based system, virtual cartridges, instead of magnetic tapes, store the backup data.

DETAILED DESCRIPTION

Figure 1:
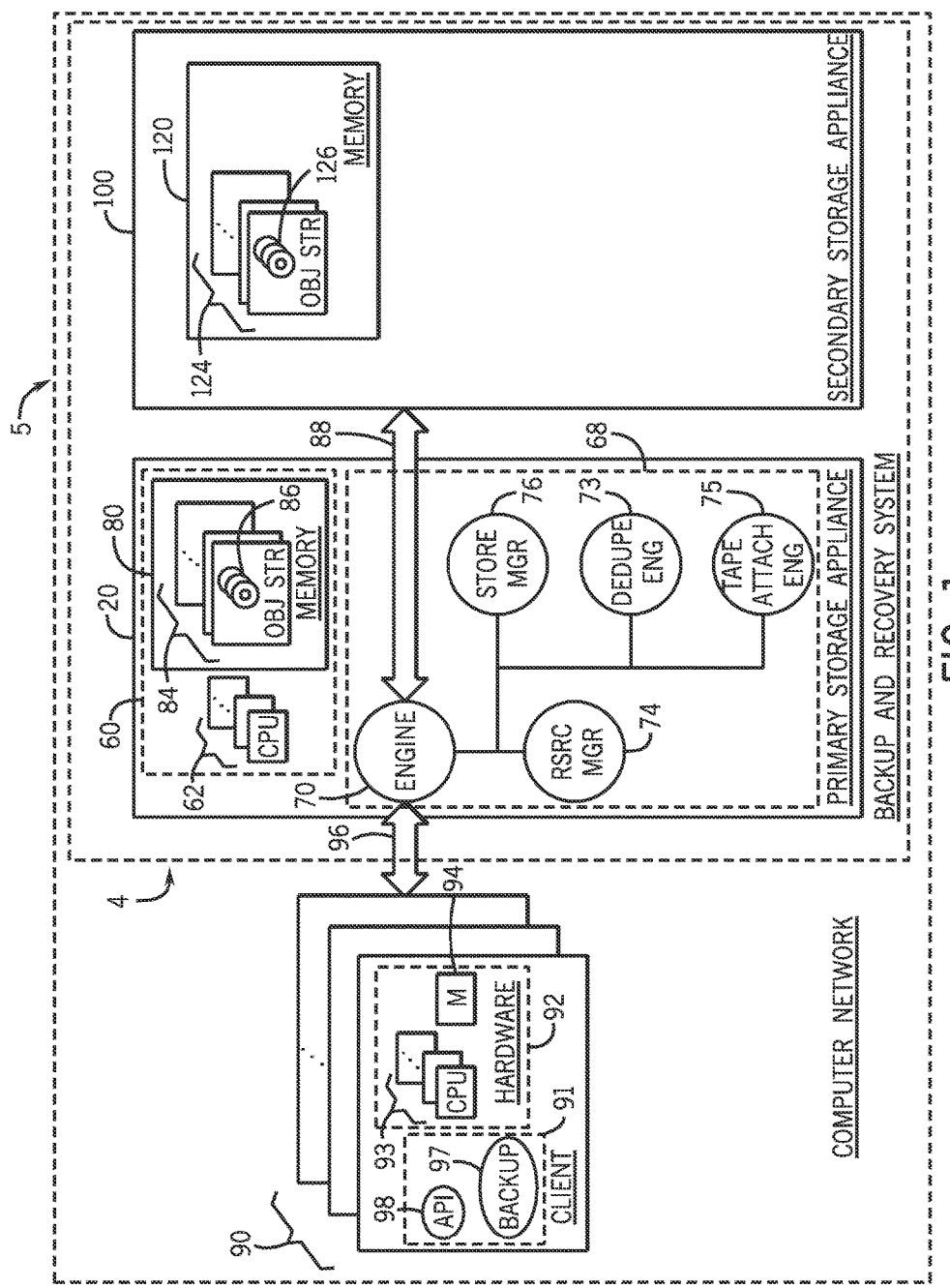
FIG. 1 is a schematic diagram of a computer network that includes a backup and recovery system according to an example implementation.

FIG. 1 depicts an example computer network 5 that includes a backup and recovery system 4 and one or multiple clients 90 of the system 4, which generate backup data (during backup sessions) stored on the system 4. The backup data may include numerous types of data, such as application-derived data, system state information, applications, files, configuration data and so forth. In general, a given client 90 may access the backup and recovery system 4 during a recovery session to restore selected data and possibly restore the client to a particular prior state. As a non-limiting example, client(s) 90 may, in general, be servers of networks that are not illustrated in FIG. 1.

In accordance with example implementations, the backup and recovery system 4 includes a primary storage appliance 20 that stores backup data for the client(s) 90 and a secondary storage appliance 100 that stores copies of this backup data. In this manner, for such purposes of adding an additional layer of backup security, the primary storage appliance 20 may occasionally replicate backup data stored on the primary storage appliance 20 to produce corresponding replicated backup data stored by the secondary storage appliance 100.

Depending on the particular implementation, the primary storage appliance 20 and the secondary storage appliance 100 may be located at the same facility and share a local connection (a local area network (LAN) connection, for example) or may be disposed at different locations and be remotely connected (via a wide area network (WAN) connection, for example). In the example that is depicted in FIG. 1, the primary storage appliance 20 communicates with the secondary storage appliance 100 using a communication link 88. The communication link 88 represents one or multiple types of network fabric (i.e., WAN connections, LAN connections wireless connections, Internet connections, and so forth).

The client(s) 90 communicate with the primary storage appliance 20 using a communication link 96, such as one or multiple buses or other fast interconnects. The communication link 96 represents one or multiple types of network fabric (i.e., WAN connections, LAN connections wireless connections, Internet connections, and so forth). In general, the client(s) 90 may communicate with the primary storage appliance 20 using one or multiple protocols, such as a serial attach Small Computer System Interface (SCSI) bus protocol, a parallel SCSI protocol, a Universal Serial Bus (USB) protocol, a Fibre Channel protocol, an Ethernet protocol, and so forth.

Depending on the particular implementation, the communication link 96 may be associated with a relatively high bandwidth (a LAN connection, for example), a relatively low bandwidth (a WAN connection, for example) or an intermediate bandwidth. Moreover, a given client 90 may be located at the same facility of the primary storage appliance 20 or may be located at a different location than the primary storage appliance 20, depending on the particular implementation. One client 90 may be local relative to the primary storage appliance 20, another client 90 may be remotely located with respect to the primary storage appliance, and so forth. Thus, many variations are contemplated, which are within the scope of the appended claims.

In accordance with some implementations, the primary storage appliance 20, the secondary storage appliance 100 and the client(s) 90 are "physical machines," or actual machines that are made up of machine executable instructions (i.e., "software") and hardware. Although each of the primary storage appliance 20, the secondary storage appliance 100 and the client(s) 90 is depicted in FIG. 1 as being contained within a box, a particular physical machine may be a distributed machine, which has multiple nodes that provide a distributed and parallel processing system.

In accordance with some implementations, the physical machine may be located within one cabinet (or rack); or alternatively, the physical machine may be located in multiple cabinets (or racks).

A given client 90 may include such hardware 92 as one or more central processing units (CPUs) 93 and a memory 94 that stores machine executable instructions 93, application data, configuration data and so forth. In general, the memory 94 is a non-transitory memory, which may include semiconductor storage devices, magnetic storage devices, optical storage devices, and so forth. The client 90 may include various other hardware components, such as one or more of the following: mass storage drives; a network interface card to communicate with the communication link 96; a display; input devices, such as a mouse and a keyboard; and so forth.

A given client 90 may include machine executable instructions 91 that when executed by the CPU(s) 93 of the client 90 form a backup application 97. In general, the backup application 97 performs various functions pertaining to the backing up and restoring of data for the client 90. As a non-exhaustive list of examples, the functions that are performed by the backup application 97 may include one or more of the following: generating backup data; communicating backup data to the primary storage appliance 20; accessing the backup data on the primary storage appliance 20; searching and organizing the storage of backup data on the primary storage appliance 20; reading, writing and modifying attributes of the backup data; monitoring and controlling one or multiple aspects of replication operations that are performed at least in part by the primary storage appliance 20 to replicate backup data onto the secondary storage appliance 100; performing one or more functions of a given replication operation; restoring data or system states on the client 20 during a recovery session; and so forth.

The client 90 may include, in accordance with exemplary implementations that are disclosed herein, a set of machine executable instructions that when executed by the CPU(s) 93 of the client 90 form an application programming interface (API) 98 for accessing the backup and recovery system 4. In general, the API 98 is used by the backup application 97 to communicate with the primary storage appliance 20 for purposes of performing one of the above-recited functions of the application 97.

In accordance with implementations, the client 90 may include a set of machine executable instructions that form an adapter for the backup application 97, which translates commands and requests issued by the backup application 97 into corresponding API commands/requests, and vice versa.

A given client 90 may include other various other sets of machine executable instructions that when executed by the CPU(s) 93 of the client 90 perform other functions. As examples, a given client 90 may contain machine executable instructions for purposes of forming an operating system; a virtual machine hypervisor; a graphical user interface (GUI) to control backup/restore operations; device drivers; and so forth. Thus, many variations are contemplated, which are within the scope of the appended claims.

Being a physical machine, the primary storage appliance 20 also contains hardware 60 and machine executable instructions 68. For example, the hardware 60 of the primary storage appliance 20 may include one or more CPUs 62; a non-transitory memory 80 (a memory formed from semiconductor storage devices, magnetic storage devices, optical storage devices, and so forth) that stores machines executable instructions, application data, configuration data, backup-related data, and so forth; and one or multiple random access drives 63 (optical drives, solid state drives, magnetic storage drives, etc.) that store, back-up related data, application data, configuration data, etc.; one or multiple sequential access mass storage devices (tape drives, for example); network interface cards; and so forth.

As also depicted in FIG. 1, the machine executable instructions 68, when executed by one or more of the CPUs 62 of the primary storage appliance 20 form various software entities for the appliance 20 such as one or more of the following, which are described herein: an engine 70, a resource manager 74, a store manager 76, a deduplication engine 73 and a tape attach engine 75.

Similar to the primary storage appliance 20, the secondary storage appliance 100 is also a physical machine that contains hardware, such as memory 120; one or more CPU(s); mass storage drives; network interface cards; and so forth. Moreover, the secondary storage appliance 100 also contains machine executable instructions to form various applications, device drivers, operating systems, components to control replication operations, and so forth.

In accordance with implementations that are disclosed herein, the backup and recovery system 4 manages the backup data as "objects" (as compared to managing the backup data as files pursuant to a file based system, for example). As can be appreciated by the skilled artisan, an "object" is an entity that is characterized by such properties as an identity, a state and a behavior; and in general, the object may be manipulated by the execution of machine executable instructions. In particular, the properties of the objects disclosed herein may be created, modified, retrieved and generally accessed by the backup application 97. In accordance with some implementations, the object may have an operating system-defined maximum size.

The objects that are stored in the backup and recovery system 4 may be organized in data containers, or "object stores." In general, in accordance with exemplary implementations, an object store has a non-hierarchical, or "flat," address space, such that the objects that are stored in a given object store are not arranged in a directory-type organization.

For the example that is depicted in FIG. 1, the primary storage appliance 20 stores backup data in the form of one or multiple objects 86, which are organized, or arranged, into one or multiple object stores 84. Moreover, for the example that is depicted in FIG. 1, the objects 86 and object stores 84 are depicted as being stored in the memory 80, although the underlying data may be stored in one or multiple mass storage drives of the primary storage appliance 20.

The secondary storage appliance 100 stores the replicated backup data in the form of one or multiple replicated objects 126, which are organized, or arranged, in one or multiple object stores 124. In other words, the replicated objects 126 are derived from the objects 86 that are stored on the primary storage appliance 20. Moreover, for the example that is depicted in FIG. 1, the objects 126 and object stores 124 are depicted as being stored in the memory 120, although the underlying data may be stored in one or multiple mass storage drives of the secondary storage appliance 100.

During a given backup session, the backup application 97 of a given client 90 accesses the primary storage appliance 20 over the communication link 96 to create, modify (append to, for example) or overwrite one or more of the backup objects 86 for purposes of storing or updating backup data on the primary storage appliance 20. Likewise, during a given restoration session, the backup application 97 of a given client 90 may access the primary storage appliance 20 to retrieve one or more of the backup objects 86. In accordance with some implementations, an object 86 on the primary storage appliance 20 may be restored from a corresponding replicated object 126 stored on the secondary storage appliance 100.

For purposes of reading from or writing to a given object 86, the backup application 97 opens the object 86 and then seeks to a given location of the opened object 86 to read/write a collection of bytes. Moreover, because the data stored in the object 86 may be compressed (as further disclosed herein), the read/writing of data may include reading/writing without first decompressing, or rehydrating, the data; or the reading/writing may alternatively involve first rehydrating the data.

Figure 2:
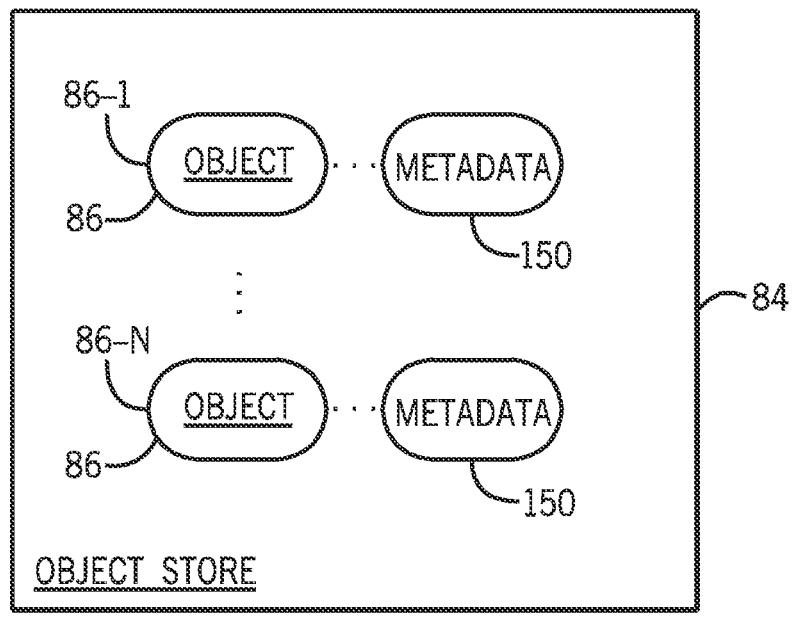
FIG. 2 is an illustration of an object store used by the backup and recovery system of FIG. 1 according to an example implementation.

The API 98, in general, provides a presentation of the object stores 84 and objects 86 to the backup application 97, which allows the backup application 97 to search for objects 86, modify objects 86, create objects 86, delete objects 86, retrieve information about certain objects 86, update information about certain objects 86, and so forth. Referring to FIG. 2 in conjunction with FIG. 1, as a more specific example, the API 98 may present the backup application 97 with a given object store 84, which contains N objects 86 (objects 86-1 . . . 86-N, being depicted as examples). In general, the objects 86 may contain data generated during one or more backup sessions, such as backup data, an image of a particular client state, header data, and so forth. The API 98 further presents object metadata 150 to the backup application 97, which the backup application 97 may access and/or modify. In general, the metadata 150 is stored with the objects 86 and describes various properties of an associated objects 86, as well as stores value-added information relating to the object 86.

As examples, the metadata 150 may indicate one or more of the following for a given associated object 86: an object type; a time/date stamp; state information relating to a job history and the relation of the object 86 to the job history; an identifier for the associated object 86; a related object store for the associated object 86; information pertaining to equivalents to legacy-tape cartridge memory contents; keys; etc. As examples, the object type may refer to whether incremental or full backups are employed for the object 86; identify the backup application 97 that created the object 86; identify the client 90 associated with the object 86; a data type (header data, raw backup data, image data, as examples); and so forth.

Access and control of the objects 86 occurs via interaction with the primary storage appliance's engine 70, the resource manager 74, the store manager 76, the deduplication engine 73 and the tape attach engine 75. In accordance with some exemplary implementations, the engine 70 serves as an external service end point for the communication links 88 and 96 for data path and control. More specifically, in accordance with some implementations, the commands and requests that are issued by the client 90 are processed by the engine 70, and vice versa. As non-limiting examples, the commands that are processed by the engine 70 include commands to open objects, close objects, write to data to objects, overwrite objects, read objects, read object data, delete objects, modify/write metadata-related information about objects, read metadata-information about objects, set preferences and configuration parameters, and so forth. The requests may include, for example, status inquiry requests, such as a request, for example, concerning the status of a particular replication job. The engine 70 further controls whether the backup and recovery system 4 operates in a low bandwidth mode of operation (described below) or in a high bandwidth mode of operation (described below) and in general, controls, replication operations to create/modify the replicated objects 126 on the secondary storage appliance 100.

The resource manager 74 manages the locking of the objects 86 (i.e., preventing modification by more than one entity at a time), taking into account resource constraints (the physical memory available, for example). In general, the resource manager 74 preserves coherency pertaining to object access and modification, as access to a given object 86 may be concurrently requested by more than one entity.

The store manager 76 of the primary storage appliance 20 is responsible for retrieving given object stores 84, controlling entities that may create and delete object stores 84, controlling the access to the object stores, controlling how the object stores 84 are managed, and so forth.

The deduplication engine 73 of the primary storage appliance 20 controls hashing and chunking operations (described below) for the primary storage appliance 20 for the primary storage appliance's high bandwidth mode of operation (also described below). The deduplication engine 73 also checks whether a chunk has already been stored, and hence decides whether to store the data or reference existing data. The deduplication engine 73 performs this checking for both low and high bandwidth modes, in accordance with exemplary implementations.

The tape attach engine 75 may be accessed by the client 90 for purposes of storing a replicated physical copy of one or more objects 86 onto a physical tape that is inserted into a physical tape drive (not shown in FIG. 1) that is coupled to the tape attach engine 75.

Figure 3:
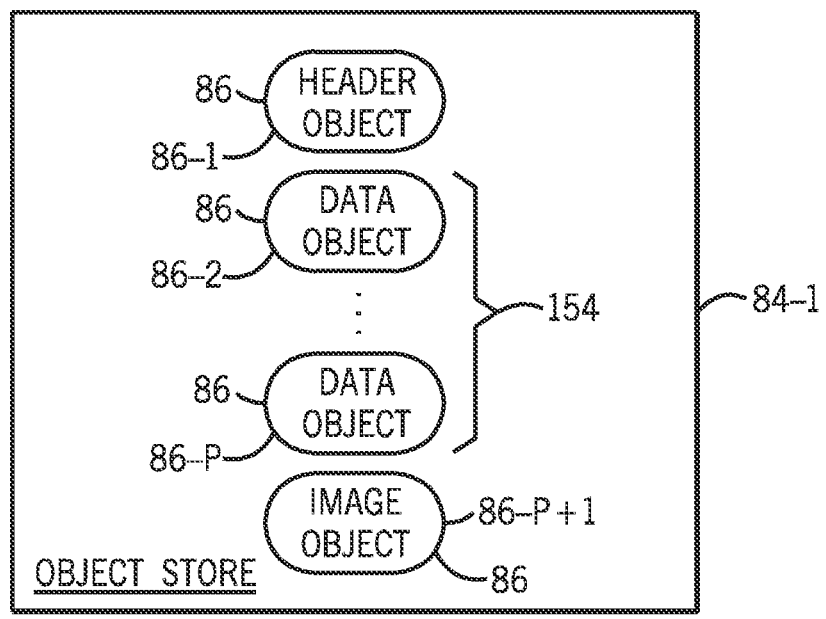
FIG. 3 is an illustration of objects in an object store created during a backup session according to an example implementation.

Referring to FIG. 3 in conjunction with FIG. 1, in accordance with exemplary implementations, the backup application 97 may create and/or modify a given set of objects 86 during an exemplary backup session. For this example, the objects are created in an exemplary object store 84-1 on the primary storage appliance 20. The creation/modification of the objects 86, in general, involves interaction with the engine 70, the resource manager 74 and the store manager 76.

The objects 86 for this example include a header object 86-1, which contains the header information for the particular backup session. As a non-limiting example, the header object 86-1 may contain information that identifies the other objects 86 used in the backup session, identifies the backup session, indicates whether compression is employed, identifies a particular order for data objects, and so forth. The objects 86 for this example further include various data objects (data objects 86-2 . . . 86-P, being depicted in FIG. 3), which correspond to sequentially-ordered data fragments of the backup session and which may or may not be compressed. For this example, the objects 86 include an image object 86-P+1, which may be used as a recovery image, for purposes of restoring a client 90 to a given state.

It is noted that the backup application 97 may randomly access the objects 86. Therefore, unlike backup data stored on a physical or virtual sequential access device (such as a physical tape drive or a virtual tape drive), the backup application 97 may selectively delete data objects 86 associated with a given backup session as the objects 86 expire. Moreover, the backup application 97 may modify a given object 86 or append data to an object 86, regardless of the status of the other data objects 86 that were created/modified in the same backup session.

For purposes of generating the replicated objects 126 that are stored on the secondary storage appliance 100, the backup and recovery system 4 uses data replication operations, called "deduplication operations." The deduplication operations, in general, reduce the amount of data otherwise communicated across the communication link 88 between the primary storage appliance 20 and the secondary storage appliance 100. Such a reduction may be particularly beneficial when the communication link 88 is associated with a relatively low bandwidth (such as a WAN connection, for example).

Figure 4:
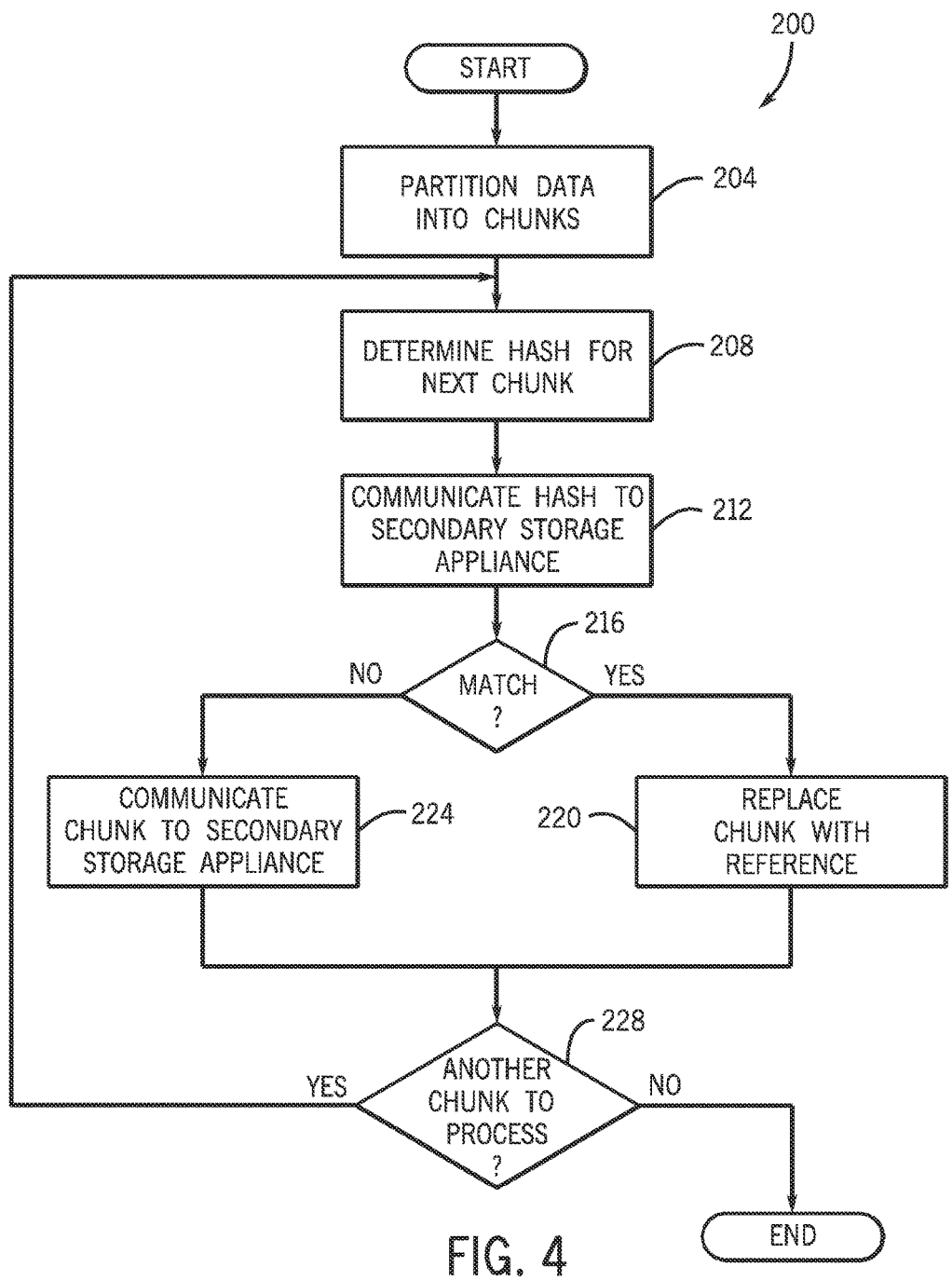
FIG. 4 is a flow diagram depicting a technique to replicate backup data according to an example implementation.

FIG. 4 generally depicts an example replication operation 200, in accordance with some implementations, for purposes of replicating the objects 86 stored on the primary storage appliance 20 to produce corresponding replicated objects 126, which are stored in corresponding object stores 124 on the secondary storage appliance 100. Referring to FIG. 4 in conjunction with FIG. 1, in accordance with exemplary implementations, the replication operation 200 includes partitioning (block 204) the source data (i.e., the data of the source object 86) into blocks of data, called "chunks." In this manner, the partitioning produced an ordered sequence of chunks to be stored on the secondary storage appliance 100 as part of the destination, replication object 126.

For purposes of reducing the amount of data communicated over the communication link 88, the chunk is not communicated across the communication link 88 if the same chunk (i.e., a chunk having a matching or identical byte pattern) is already stored on the secondary storage appliance 100. Instead, a reference to the previously stored chunk is stored in its place in the destination object, thereby resulting in data compression.

For purposes of determining whether a given chunk has already been stored on the secondary storage appliance 100, a signature of the chunk is first communicated to the secondary storage appliance 100. More specifically, in accordance with exemplary implementations, a cryptographic function may be applied to a given candidate chunk for purposes of determining (block 208 of FIG. 4) a corresponding unique hash for the data. The hash is then communicated to the secondary storage appliance 100, pursuant to block 212. The secondary storage appliance 100 compares the received hash to hashes for its stored chunks to determine whether a copy of the candidate chunk is stored on the appliance 100 and informs the primary storage appliance 20 of the determination.

If a match occurs (decision block 216), the primary storage appliance 20 does not transmit the candidate chunk to the secondary storage appliance 100. Instead, the primary storage appliance 20 transmits a corresponding reference to the already stored chunk to be used in its place in the destination object, pursuant to block 220. Otherwise, if a match does not occur (pursuant to decision block 216), the primary storage appliance 20 transmits the candidate chunk across the communication link 88 to the secondary storage appliance 100, pursuant to block 224. The secondary storage appliance 100 therefore stores either a chunk or a reference to the chunk in the corresponding object 126.

If there is another chunk to process (decision block 228), control returns to block 208. The chunks are therefore processed in the above-described manner until the source data has been replicated in its compressed form onto the secondary storage appliance 100. The data reduction due to the above-described data deduplication operation 200 may be characterized by a data compression, or "deduplication," ratio.

Referring back to FIG. 1, in accordance with exemplary implementations, the above-described replication of the objects 86 may be performed in one of two modes of operation for the backup and recovery system 4: a low bandwidth mode of operation; or a high bandwidth mode of operation. For the low bandwidth mode of operation, the client 90 performs the above-referenced chunking and hashing functions of the replication operation. In other words, the client 90 partitions the source data into chunks; applies a cryptographic function to the chunks to generate corresponding hashes; transmits the hashes; and subsequently transmits the chunks or references to the chunks, depending on whether a match occurs. The low bandwidth mode of operation may be particularly advantageous if the client 90 has a relatively high degree of processing power; the communication link 96 is a relatively low bandwidth link (a WAN connection, for example); the deduplication ratio is relatively high; or a combination of one or more of these factors favor the chunking and hashing to be performed by the client 90.

In the high bandwidth mode of operation, the chunking and hashing functions are performed by the primary storage appliance 20. The high bandwidth mode of operation may be particularly advantageous if the primary storage appliance 20 has a relatively high degree of processing power, the communication link 96 has a relatively high bandwidth (a LAN connection, for example); the deduplication ratio is relatively low; or a combination of one or more of these factors favor the chunking and hashing to be performed by the primary storage appliance 100.

In accordance with some implementations, the backup application 97 may specify a preference regarding whether the low bandwidth or the high bandwidth mode of operation is to be employed. As an example, the preference may be communicated via a command that is communicated between the client 90 and the engine 70. Based on this preference, the engine 70 either relies on the client 90 (for the low bandwidth mode of operation) or on the deduplication engine 73 (for the high bandwidth mode of operation) to perform the chunking and hashing functions.

Figure 5:
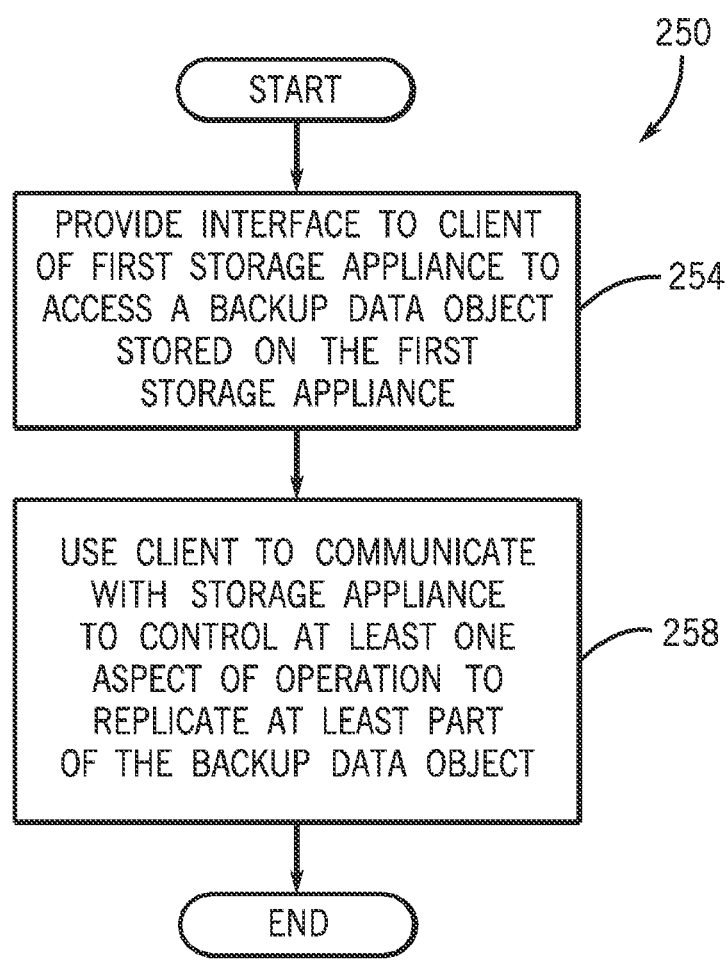
FIG. 5 is a flow diagram depicting a technique to access object-based backup data stored on the backup and recovery system of FIG. 1 and control at least one aspect of an operation to replicate the backup data according to an example implementation.
Figure 6:
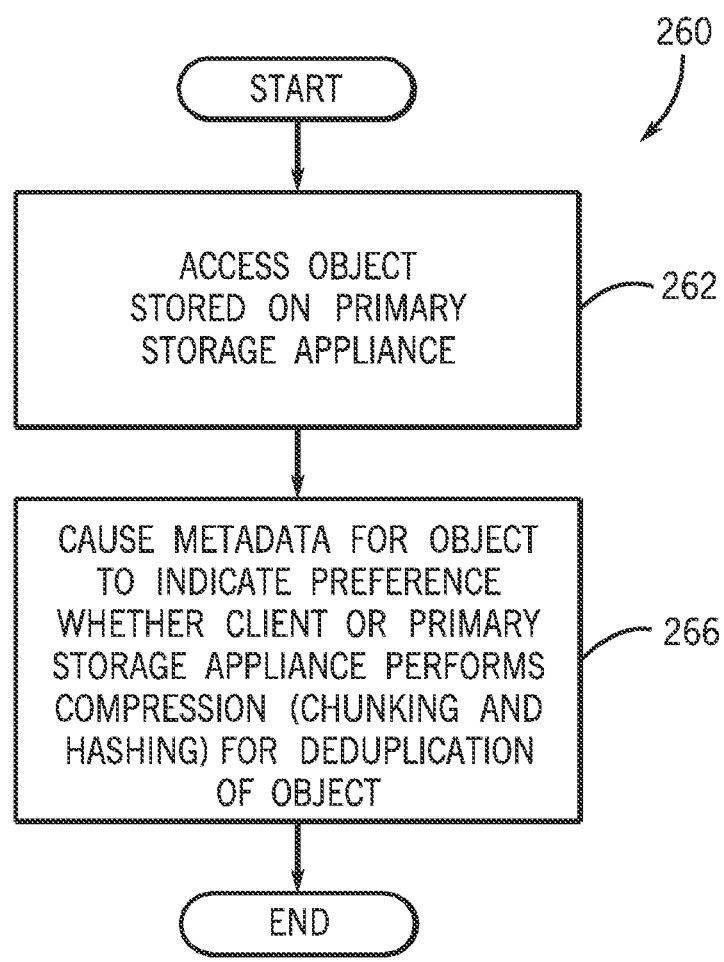
FIG. 6 is a flow diagram depicting a technique used by a backup application of FIG. 1 to regulate replication of data by the backup and recovery system according to an example implementation.

Referring to FIG. 5 in conjunction with FIG. 1, to summarize, in accordance with exemplary implementations, the API 98 permits the backup application 97 to perform a technique 250. Pursuant to the technique 250, the API 98 provides an interface to the client of a storage appliance, which allows the client to access an object (the "source object") that is stored on the storage appliance, pursuant to block 254. The client may communicate (block 258) with the storage appliance to control at least one aspect of an operation to replicate at least part of the source object to produce a destination object. Thus, as set forth above, as an example, pursuant to a technique 260 (see FIG. 6), the backup application 97 may access (block 262) an object 86 that is stored on a primary storage appliance 20 and cause metadata (block 266) for the object 86 to indicate a preference regarding whether the client 90 or the primary storage appliance 20 performs compression (chunking and hashing) for deduplication of the object 86.

It is noted that replication may occur between differ object stores on the same storage appliance, or even data between two objects within a given object store. Although the entire object may be replicated, a given replication operation may involve replicating part of a given object, rather than the entire object. Moreover, a destination object may be constructed from one or multiple replicated regions from one or multiple source objects; and the destination object may be interspersed with one or multiple regions of data backed up from the client directly to the destination object. Thus, many variations are contemplated, which are within the scope of the appended claims.

Figure 7:
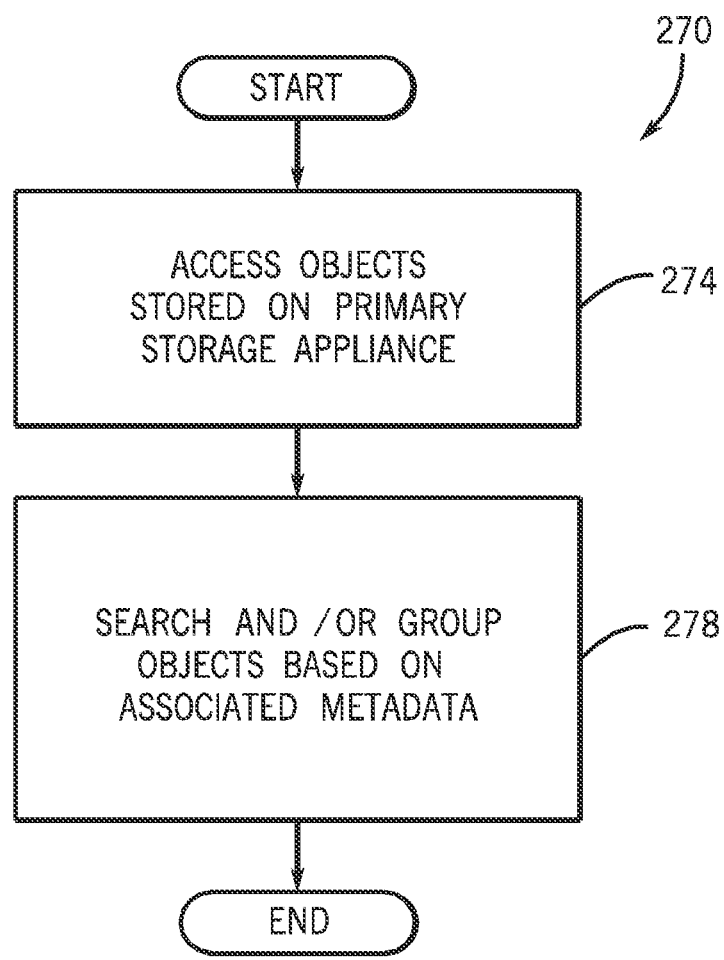
FIG. 7 is a flow diagram depicting a technique used by the backup application of FIG. 1 to search and/or group data objects stored on the backup and recovery system according to an example implementation.

The use of objects by the backup and recovery system 4 allows a relatively richer searching and grouping of backup data, as compared to, for example, a virtual tape drive-based system in which the backup data is arranged in files that are stored according to a tape drive format. More specifically, referring to FIG. 7 in conjunction with FIG. 1, pursuant to a technique 270, the backup application 97 may access (block 274) objects that are stored on the primary storage appliance and search and/or group the objects based on the associated metadata, pursuant to block 278.

In accordance with example implementations, the replication engine 70 dynamically varies datapath parameters used in the replication operations based at least in part on current and historical behaviors that are/have been observed during corresponding current/historical replication operations. This regulation allows the tuning of the replication operations over time and allows tuning in real time of ongoing replication operations for purposes of optimizing replication performance.

Figure 8:
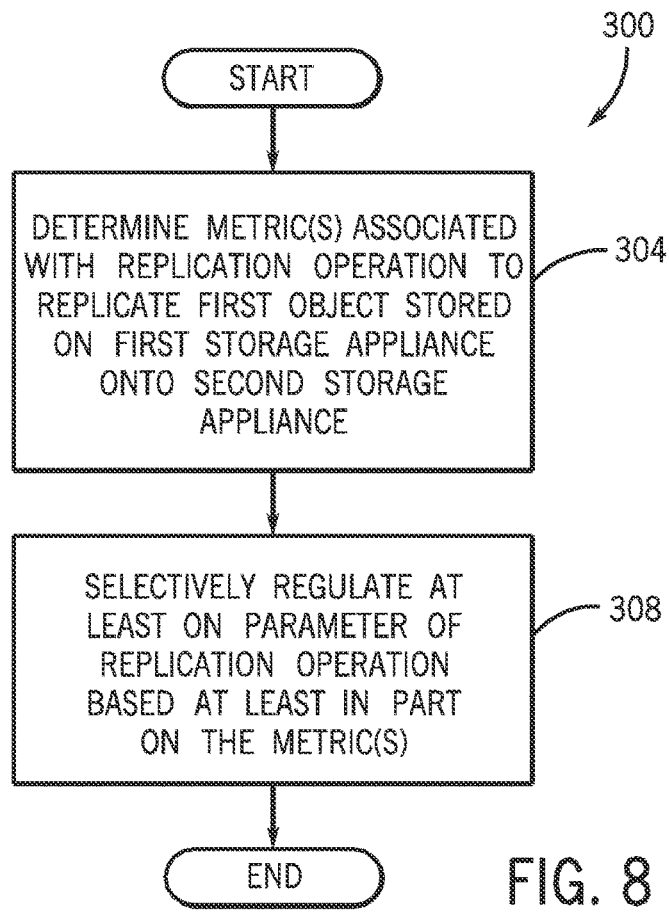
FIG. 8 is a flow diagram depicting a technique to regulate a replication operation according to an example implementation.

More specifically, referring to FIG. 8 in conjunction with FIG. 1, in accordance with exemplary implementations, the replication engine 70 performs a technique 300 for purposes of regulating at least one parameter of a replication operation. Pursuant to the technique 300, the replication engine 70 determines (block 304) one or multiple metrics, which are associated with a prior or a currently ongoing replication operation to replicate at least part of a first object that is stored on a first storage appliance onto a second storage appliance. The replication engine 70 selectively regulates (block 308) at least one parameter of the replication operation based at least in part on the determined metric(s).

It is noted that, in accordance with further embodiments, the regulated replication operation may be an operation to replicate at least part of an object that is stored on the primary storage appliance 20 or secondary storage appliance 100 onto the client 90, replicate at least part of an object that is stored on the client 90 onto the primary storage appliance 20 or secondary storage appliance, and so forth. Moreover, in accordance with these further implementations, the replication operation may be regulated using an engine of the client 90 or an engine of the secondary storage appliance 100. Therefore, in general, in accordance with example implementations that are disclosed herein, one or multiple metrics, which are associated with a prior or a currently ongoing replication operation to replicate at least part of an object stored on one of the client 90, the primary storage appliance 20 and the secondary storage appliance 100 onto another one of the client 90, the primary storage appliance 20 and the secondary storage appliance 100 are determined; and the replication operation is selectively regulated based on the determined metric(s).

Figure 9:
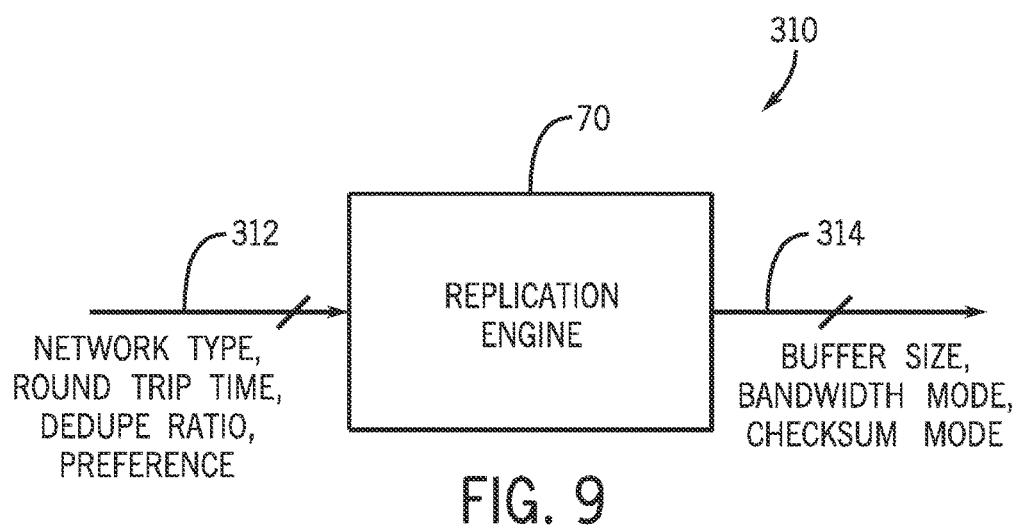
FIG. 9 is a schematic diagram illustrating regulation of a replication operation by the replication engine of FIG. 1 according to an example implementation.

Referring to FIG. 9, which depicts an illustration 310 of the above-described regulation, the replication engine 70 may base the regulation on a number of different metrics. In this manner, the replication engine 70 may receive a number of inputs, such as a network type (whether a high or low bandwidth connection is involved in the replication datapath, for example); a round trip time of the replication datapath; a deduplication ratio; a client-selected preference; and so forth. Based on these inputs 312, the replication engine 70 generates one or more outputs 314, which directly affect and therefore, regulate the replication operation, such as a buffer size, a bandwidth mode and a checksum mode, as further described below.

As a more specific example, the replication engine 70 tunes the outputs 314 based on the inputs 312 for the replication operations that are currently and have previously been run on specific network links, such as local area network (LAN) links and wide area network (WAN) links, for example. For example, as can be appreciated by the skilled artisan, certain replication operation parameter combinations may be appropriate for lower bandwidth links, such as WAN links; and other parameter combinations may be more appropriate for relatively higher bandwidth links, such as LAN links, for example. In general, a WAN link tends to have a relatively higher latency, and as a result, the replication engine 70 may tend to, for this latency, select a relatively larger buffer size, i.e., the size of the link interface buffers used by the primary storage appliance 20 and the client 90 (as non-limiting examples), for communicating data over the communication link 96. Conversely, the replication engine 70 may select a smaller buffer size for a relatively higher bandwidth link.

The bandwidth mode of operation that is employed for the replication operation may be selected based on these and other factors. For example, the following factors favor the use of the low bandwidth mode of operation (in which the client 90 performs the hashing and chunking functions for transfers between the client 90 and storage appliance 20): the communication link employed has a relatively low bandwidth, the data has a relatively high deduplication ratio (the ratio of the source data to the uncompressed, or deduplicated, destination data) and the client 90 has a relatively large amount of available processing power. The following factors favor the use of the high bandwidth mode of operation (in which the primary storage appliance 20, for example, performs the hashing and chunking functions for transfers between the client 90 and appliance 20): the communication link employed has a relatively high bandwidth, the data has a relatively low deduplication ratio and the client 90 has a relatively low amount of available processing power. More than or fewer than three factors may be considered, in accordance with further implementations.

In accordance with some implementations, the bandwidth mode of operation is selected based on how many of these factors favor the low or high bandwidth modes operation. For example, in accordance with some implementations, a simple yes/no equal weighting may be applied to each factor to determine which mode of operation to use. In accordance with further implementations, a proportional weighting scheme may be employed.

As a more specific example, for the equal weighting scheme in which the above-described three factors are considered, the low bandwidth mode operation is selected if at least two factors applied (e.g., the link is a relatively low bandwidth link and the client has a relatively large amount of processing power); or the high bandwidth mode of operation may be selected if at least two of the factors apply (e.g., the link is a relatively high bandwidth link and the data has a relatively low deduplication ratio).

Alternatively, for the proportional weighting scheme, the factors may be weighted more proportionally, such as on a scale of 1 to 10 (as an example) 5. As a more specific example, for this weighting scheme, a relatively low bandwidth 128 Kbps WAN link may be assigned a "1" on the scale; a relatively high bandwidth 10 Gb Ethernet link may be assigned a "10" on the scale; zero percent dedupable data (not at all dedupable) may be assigned a "1" on the scale; one hundred percent dedupable data (very dedupable) may be assigned a "10" on the scale; a single CPU for the client 90 may be assigned a "1" on the scale; sixteen CPUs for the client 90 may be assigned a "10" on the scale; and so forth. In accordance with some implementations, the scale values for the factors are added together for purposes of selecting the mode of operation. For example, for a possible total of "30" any total under "15" means that the low bandwidth mode of operation is selected.

In accordance with the implementations that are disclosed herein, the term "replication operation" applies to operations that involve copying an existing object (partially or in its entirety) to another object as well as operations that involve backups from the client 90 to the storage appliance, where there is no pre-existing object, such as backups that involve a data stream that is being created "on the fly" and stored as an object on the storage appliance 20, for example. For example, the backup may be chunked and hashed on the client 90, with just new data sent to the server (using the low bandwidth mode of operation); or as another example, all of the data may be sent to the storage appliance 20, and chunked and hashed on the appliance 20 (using the high bandwidth mode of operation).

Moreover, in accordance with some implementations, either the storage appliance 20, 100 or the client 90 may lead the decision regarding which data transfer parameters to use, depending on which one is sending the data. For example, for backup operations in which the client 90 is storing backup data on the primary storage appliance 20, the client 90 may determine the data transfer parameters in accordance with the techniques and systems that are disclosed herein. As another example, the primary storage appliance 20 may determine the data transfer parameters for replication operations to the secondary storage appliance 100. In general, in accordance with example implementations, the sender negotiates the data transfer parameters with the receiver, such that the negotiated parameters are as close as possible to that decided by the sender, and which the receiver is able to support. More generally, either side could decide and then negotiate with the other.

In accordance with an exemplary implementation, based on the inputs 312, the replication engine 70 may select whether error correction or detection is used during the replication operation. In this manner, the replication engine 70 may determine whether to use a checksum mode (in which error correction or detection codes are employed) based on whether or not the communication 96 is a type of link associated with a relatively lower bit error rate or a type of link associated with a relatively higher bit error rate.

In this manner, checksums are used to preserve data integrity across a link. The checksum may either be used for error detection or error correction. As compared to error correction, error detection is relatively faster to compute and uses a relatively smaller checksum (and hence less bandwidth overhead). However, error detection does not allow correction "on the fly," as error detection resumes the job from a known good checkpoint. In general, a WAN link has a relatively high bit error rate and a LAN link has a relatively low bit error rate. Therefore, in accordance with some implementations, if data is being transferred across a WAN link, checksums for purposes of error correction may be used. Many variations, however, are contemplated. For example, checksums for error detection (and not detection) or no checksums may be employed for a LAN link, checksums for error detection (and not detection) may be employed for a WAN link, and so forth, depending on the particular implementation.

In accordance with some example implementations, the replication engine 70 determines the particular bandwidth of the communication link 96 based on th on characteristics of the link 96. For example, the replication engine 70 may determine whether the link 96 is a WAN or LAN link by observing latency of the link 96 and the number of and type of hops in the route. The replication engine 70 may also use historical data if available: the engine 70 may, for example, observe how many times data packets have had to be retransmitted, as an indication of error rate.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   determining at least one metric associated with a replication operation to replicate at least a portion of a first object stored on a first entity comprising one of a client, a first storage appliance and a second storage appliance onto a second entity comprising another one of the client, the first storage appliance and the second storage appliance, wherein the replication operation comprises compressing data, wherein the first entity is capable of compressing the data and the second entity is capable of compressing the data; and
   regulating the replication operation, the regulating comprising selecting whether the first entity or the second entity is to perform the compressing of the data based at least in part on the at least one metric.

2. The method of claim 1, wherein determining the at least one metric comprises determining a metric associated with a performance of a prior operation to replicate another object.

3. The method of claim 1, wherein determining the at least one parameter comprises determining a metric associated with a performance of an operation to replicate the object.

4. The method of claim 1, wherein:
   determining the at least one metric associated with the replication operation comprises determining a type of network used for routing replication data between the first and second storage appliances; and
   selectively regulating comprises regulating a buffer size used in the replication operation based at least in part on the determined network type.

5. The method of claim 1, wherein:
   determining the at least one metric associated with the replication operation comprises determining a first processor utilization associated with the first entity and a second processor utilization associated with the second entity; and
   regulating the replication operation comprises selecting one of the first entity and the second entity to perform compressing the data based at least in part on the determined first and second processor utilizations.

6. The method of claim 1, wherein:
   determining the at least one metric associated with the replication operation comprises determining a data compression ratio associated with the replication operation; and
   regulating the replication operation comprises selecting one of the first and second entities to perform the compressing of the data based at least in part on the determined data compression ratio.

7. The method of claim 1, wherein:
   determining the at least one metric associated with the replication operation comprises determining a type of network used for routing replicated data between the first and second storage appliances; and
   selectively regulating comprises regulating whether error correction codes are used in the replication operation based on the determined network type.

8. The method of claim 1, wherein the replication operation comprises an operation to deduplicate data.

9. An apparatus comprising:
a metric analyzer comprising a hardware processor to determine at least one metric associated with a replication operation to replicate at least part of a first object stored on a first entity comprising one of a client, a first storage appliance and a second storage appliance onto a second entity comprising another one of the client, the first storage appliance and the second storage appliance, wherein the first entity is capable of compressing the data and the second entity is capable of compressing the data; and
a replication controller comprising a hardware processor to regulate the replication operation, the controller to select whether the first entity or the second entity is to compress data associated with the replication operation based at least in part on the at least one metric.

10. The apparatus of claim 9, wherein the metric analyzer is adapted to determine a metric associated with a performance of a prior operation to replicate another object.

11. The apparatus of claim 9, wherein the metric analyzer is adapted to determine a metric associated with a performance of an operation to replicate the object.

12. The apparatus of claim 9, wherein:
the metric analyzer is adapted to determine a type of network used for routing replication data between the first and second storage appliances; and
the replication controller to regulate a buffer size used in the replicating based on whether a high bandwidth link or a low bandwidth link is used.

13. The apparatus of claim 9, wherein:
the metric analyzer is adapted to determine a first processor utilization associated with the first entity and a second processor utilization associated with the second entity; and
the replication controller is adapted to select one of the first and second entities to perform compressing the data based at least in part on the determined first and second processor utilizations.

14. The apparatus of claim 9, wherein:
the metric analyzer is adapted to determine a data compression ratio associated with the replication operation; and
the replication controller is adapted to regulate whether the client or the first storage appliance performs data compression in connection with the replication operation based on the determined data compression ratio.

15. The apparatus of claim 9, wherein:
the metric analyzer is adapted to determine a type of network used for routing replicated data between the first and second storage appliances; and
the replication controller is adapted to regulate whether error correction codes are used in the replication operation based on the determined network type.

16. The apparatus of claim 9, wherein the replication operation comprises an operation to deduplicate data.

17. An article comprising a non-transitory computer readable storage medium to store instructions that when executed by at least one processor cause the at least one processor to:
determine at least one metric associated with a replication operation to replicate at least part of a first object stored on a first entity comprising one of a client, a first storage appliance and a second storage appliance onto a second entity comprising another one of the client, the first storage appliance and the second storage appliance, wherein the replication operation comprises compressing data, wherein the first entity is capable of compressing the data and the second entity is capable of compressing the data; and
regulate the replication operation, the regulation comprising selecting whether the first entity or the second entity is to perform the compressing of the data based at least in part on the at least one metric.

18. The article of claim 17, wherein the replication operation comprises an operation to deduplicate data.

* * * * *